United States Patent
Liversidge

(10) Patent No.: US 6,718,848 B1
(45) Date of Patent: Apr. 13, 2004

(54) WIRE STRIPPER

(76) Inventor: Barry Peter Liversidge, The Wick, Wick Road, Langham, Colchester, Essex (GB), C04 5PE ( * ) Notice: Subject to any disclaimer, the term of this patent is extended or adjusted under 35 U.S.C. 154(b) by 32 days.

(21) Appl. No.: 10/129,178

(22) PCT Filed: Nov. 3, 2000

(86) PCT No.: PCT/GB00/04210

§ 371 (c)(1),
(2), (4) Date: May 3, 2002

(87) PCT Pub. No.: WO01/35507

PCT Pub. Date: May 17, 2001

(30) Foreign Application Priority Data

Nov. 6, 1999 (GB) ............................................... 9926244

(51) Int. Cl.$^7$ ................................................. H02G 1/12
(52) U.S. Cl. .......................... 81/9.42; 81/9.41; 81/9.43; 81/9.1; 81/9.51
(58) Field of Search ................................. 81/9.42, 9.41, 81/9.43, 9.1, 9.51, 9.2, 9.5, 9.44

(56) References Cited

U.S. PATENT DOCUMENTS

| 4,112,791 A | * | 9/1978 | Wiener | 81/9.43 |
| 4,395,928 A | * | 8/1983 | Undin et al. | 81/9.43 |
| 4,407,174 A | * | 10/1983 | Schulze | 81/9.42 |
| 5,063,795 A | * | 11/1991 | Krampe | 438/626 |
| 5,101,693 A | * | 4/1992 | Chambers | 81/9.43 |
| 5,245,894 A | * | 9/1993 | Undin | 81/9.43 |
| 5,724,871 A | * | 3/1998 | Wall | 81/9.43 |
| 6,079,296 A | * | 6/2000 | Muromoto | 81/9.43 |

* cited by examiner

Primary Examiner—Lee D. Wilson
Assistant Examiner—Alvin J Grant
(74) Attorney, Agent, or Firm—Andrus, Sceales, Starke & Sawall, LLP

(57) ABSTRACT

A manual wire-stripper has first and second wire clamping jaws, a pair of stripping jaws disposed between the clamping jaws and an operating mechanism including a lever pivoted to the stripper body to extend alongside a fixed lever. A slidably mounted draw-bar is connected to the stripping jaws and provides a first cam surface. An arm projecting from the second clamping jaw provides a second cam surface, a roller being located between the first and second cam surfaces and a rearwardly directed edge of the operating lever. During initial movement of the operating lever the roller is driven against the first and second cam surfaces to effect closing movement of the wire-clamping jaws. Continued movement of the operating lever moves the roller along the second cam surface to drive the draw-bar rearwardly, to act on the first cam surface and effect sliding stripping movement of the stripping jaws.

20 Claims, 5 Drawing Sheets

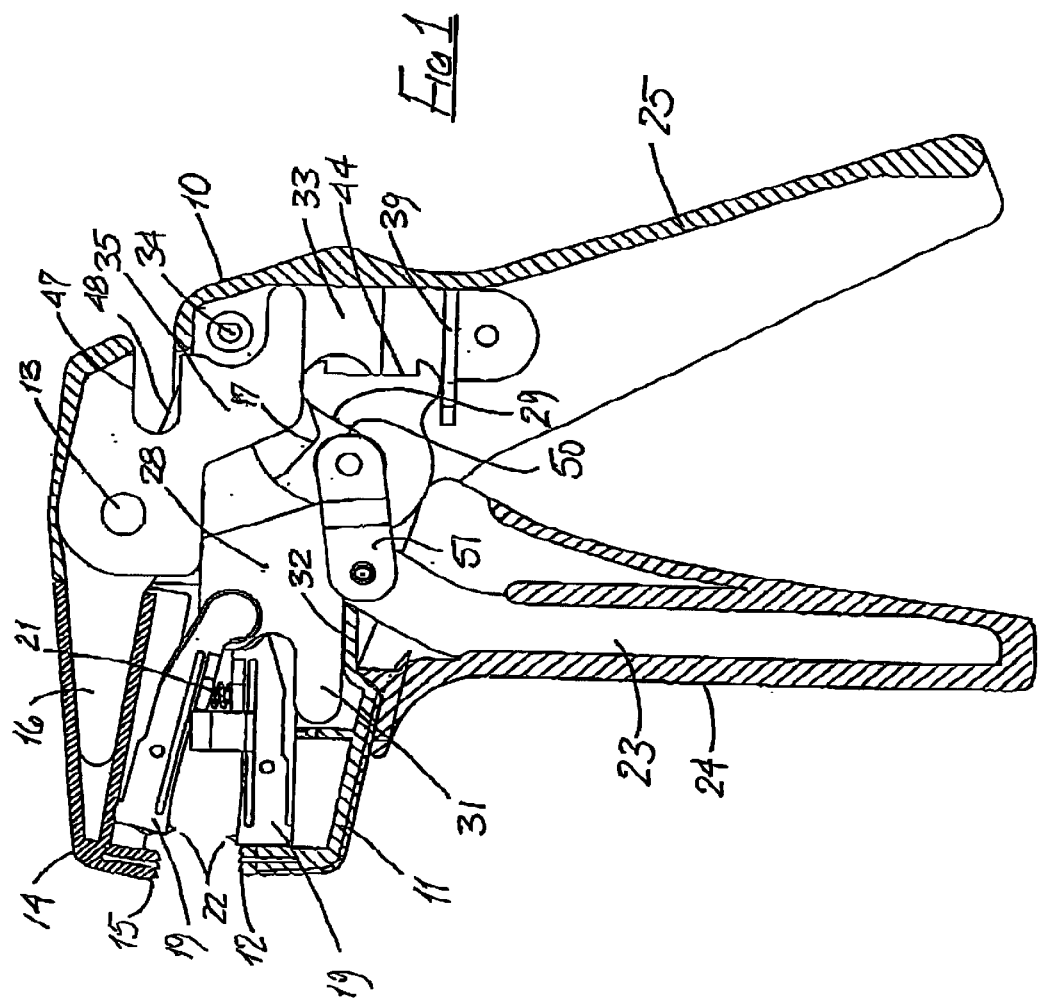

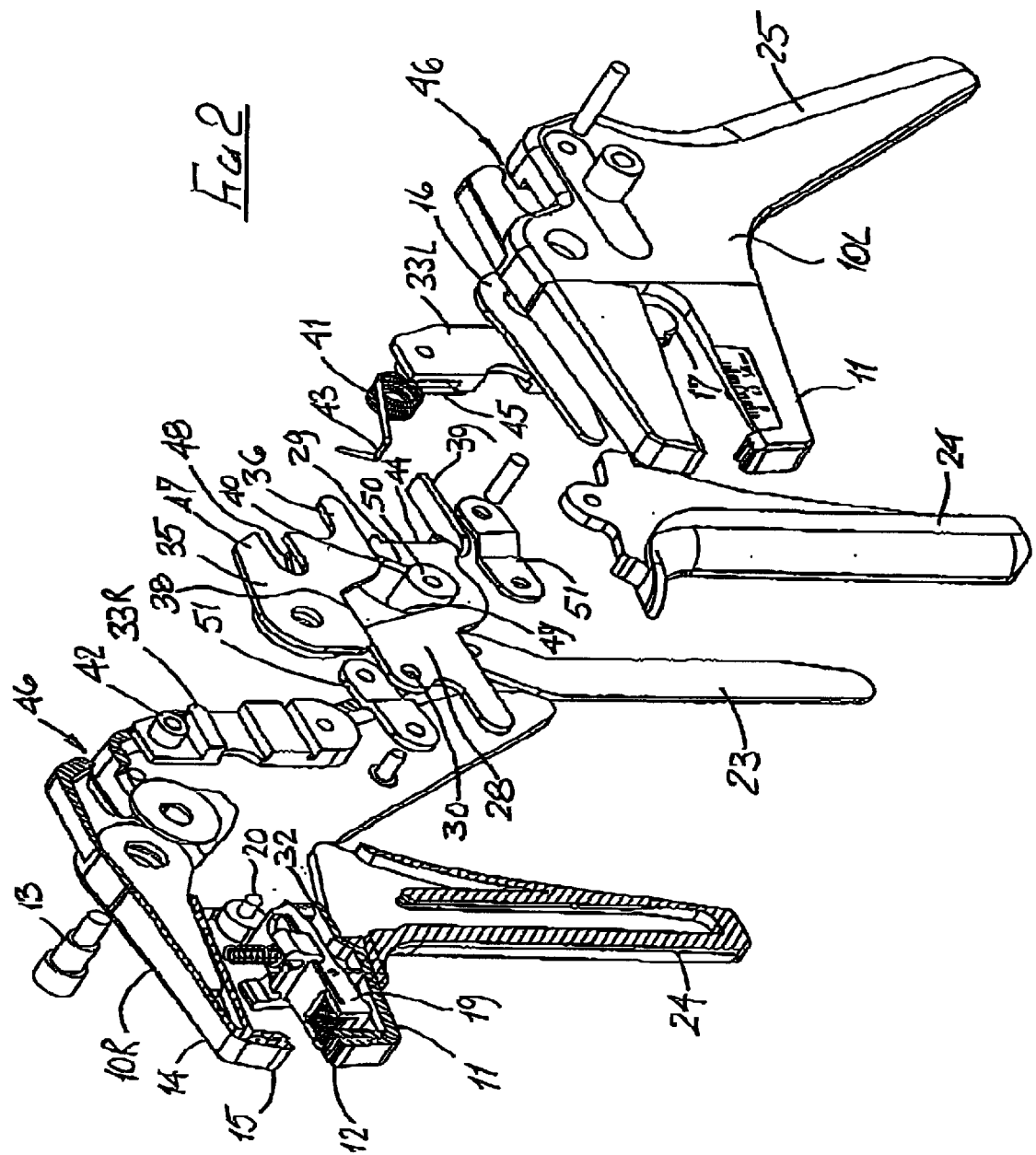

WIRE STRIPPER

CROSS-REFERENCE TO RELATED APPLICATIONS

This application is the U.S. national stage application of International Application PCT/GB00/04210, filed Nov. 3, 2000, which international application was published on May 17, 2001 as International Publication WO 01/35507 A1 in the English language. The International Application claims priority of Great Britain Patent Application 9926244.6, filed Nov. 6, 1999.

BACKGROUND OF THE INVENTION

This invention relates to a manually-operable wire stripper—that is to say a hand tool for separating and at least partially removing an end portion of an outer layer of an elongate filamentary member having an inner core surrounded by said outer layer.

In the following, the invention will exclusively be defined and described with reference to the stripping of an electrical wire, having an inner core conductor and an outer insulating layer. It will however be understood that the invention may be used to remove an end portion of an outer layer surrounding a different kind of core member—for example, an outer sheath surrounding a fibre optic cable. As such, the terms "wire" and "insulation" as used herein should be interpret broadly.

There have been numerous designs of hand-held and manually-operated wire strippers, all of which aim at providing a tool which is easy to use, requires a relatively small operating force, and which can be manufactured relatively cheaply from few parts, without greatly compromising functionality. A further aim of many of these tools is to provide automatic adjustment so that no separate manual adjustment need be made to suit different wire diameters and insulation thicknesses.

One commercially successful wire stripper is described in EP-A-0,007,699. This tool has a pair of handles between which is mounted a complex cam mechanism arranged to close both a pair of wire clamping jaws and a pair of insulation stripping jaws, a link being arranged between one of the handles and the cam mechanism and which link together with the cam mechanism pass through a transition point between first and second stages of a stripping cycle. A disadvantage of this mechanism is that the velocity ratio between the handles and the stripping jaws is at its greatest when the stripping action is commenced, and at its smallest towards the end of the stripping cycle when the force required to displace the insulation is at its smallest. The consequence is that relatively high forces have to be applied to the handles in the initial stage of the stripping action, and that the length of insulation which may wholly be removed from the wire (as distinct from just displaced along the wire) is reduced. Those problems have already been considered for example in GB-B-2,077,517, which describes sophisticated cam mechanisms to optimise force transmission (ratios for both the cutting and stripping stages.

In my own earlier specification WO 94/21016 there is described a manually-operated wire stripper which addresses many of the short-comings of the known tools and in particular attempts to provide a mechanism which gives appropriate velocity ratios for the two stages of a stripping cycle. It is a principal aim of the present invention to improve on the wire stripper of this earlier specification in particular by allowing the manufacture of a compact stripping mechanism which lends itself to a right-angled construction (that is to say, a stripper where the handles project generally at right-angles to the line of action of the stripping jaws) and yet which still requires relatively low operating forces with a favourable stripping action.

SUMMARY OF THE INVENTION

According to the present invention, there is provided a manually-operable wire stripper comprising:
a body defining at its forward region a first wire-clamping jaw and at its rear a fixed handle;
a second wire-clamping jaw pivoted about a first axis to body and opposed to the fixed jaw for co-operation therewith to clamp a wire to be stripped, the first axis being displaced to one side of the centre-line of the pair of clamping jaws;
a pair of co-acting stripping jaws arranged between the damping jaws for sliding movement with respect thereto along the length of a damped wire, closing movement of the clamping jaws dosing the stripping jaws: and
an operating mechanism having;
an operating lever pivoted about said first axis to the body and extending across the line of sliding movement of the stripping jaws to project from the body, juxtaposed to the fixed handle for gripping therewith;
a draw-bar slidably mounted in the body and connected to the stripping jaws to effect said sliding movement thereof, the draw-bar defining a generally forwardly-facing first cam surface,
an arm projecting from the second clamping jaw and having a second cam surface, and
a roller located between the first and second cam surfaces and a rearwardly directed edge of the operating lever, the roller being driven by rearward pivoting movement of the lever;
the arrangement of the operating mechanism being such that during initial movement of the operating lever the roller is driven against the first and second cam surfaces to effect closing movement of the second wire-damping jaw until a wire to be stripped is clamped, whereafter continued movement of the operating lever drives the roller along the second cam surface thereby driving the draw-bar rearwardly through the first cam surface, to effect sliding stripping movement of the stripping jaws.

As will be appreciated from the embodiment of the invention described hereinafter, it is possible to configure the operating mechanism to occupy a relatively small volume without compromising performance of the wire stripper. Thus, the mechanism may still provide a relatively small stripping jaw movement at the commencement of the stripping action for significant operating lever movement, so maximising the power available at the first stage of stripping when the end portion of the insulation is partially cut and partially torn from the remainder of the insulation. In addition, the mechanism may provide a high degree of feedback to the damping force exerted by the clamping jaws, so that the clamping force is increased in the event that the stripping jaws have to exert a high force at the commencement of the stripping action, to detach the end portion of the insulation.

The mechanism may be configured to operate with a free roller by arranging said rear edge of the operating lever as a driving surface which engages the roller on rearward movement of the operating lever, provided the roller is otherwise constrained to remain between the first and second cam surfaces and the driving surface. Preferably, however, the roller is rotatably mounted to one end of a driving member, or between a pair of driving members, the other end of the (or each) driving member being connected to the operating lever.

It is known to allow both the stripping and clamping jaws to move apart at the conclusion of the stripping action. With the present stripper, this may be achieved by appropriate profiling of the second cam surface, so that as the roller approaches the limit of its movement in the stripping direction, the second clamping jaw is allowed to move away from the first camping jaw. In addition, or possibly instead, the body may define a fixed third cam surface arranged so that the roller runs along the third cam surface as the roller approaches the limit of its movement in the stripping direction. The third cam surface should be profiled so as to free the roller from the second cam surface and so to allow the second clamping jaw to move away from the first clamping jaw.

The pair of stripping jaws are preferably pivoted together about a second axis at their rearward ends and are connected to the draw-bar about that same axis. By providing a first spring between the stripping jaws, both those jaws and also the clamping jaws will be urged apart by the first spring. A second spring may be provided to urge the draw-bar forwardly, to an initial position where the mechanism is set ready to perform a stripping cycle.

The mechanism incorporated in a wire stripper of this invention lends itself to a series of appropriately profiled plates assembled together in a side-by-side manner. In such a case, the draw-bar should lie on the centre line of the clamping and stripping jaws and is constrained to perform essentially linear sliding movement substantially in alignment with the length of the first clamping jaw. Thus, the movement of the draw-bar causes the stripping jaws to slide along the length of the clamping jaws, to perform a stripping action. The draw-bar may be constrained by a guide plate secured to the body of the stripper, which guide plate may define the third cam surface, arranged to allow the second wire clamping jaw to unload the wire-clamping force. In addition, the guide plate may define a static cutter blade which co-operates with a moving cutter blade formed as a part of the operating lever. This gives the wire stripper the additional functionality of allowing the cutting of a wire to a required length.

BRIEF DESCRIPTION OF THE DRAWINGS

By way of example only two specific embodiments of wire stripper constructed and arranged in accordance with the present invention will now be described in detail, reference being made to the accompanying drawings, in which;

FIG. 1 is a sectional view through the first embodiment of a manually-operated wire stripper of this invention, when in an initial position ready to perform a stripping cycle;

FIG. 2 is an exploded isometric view of the various components which make up the stripper of FIG. 1;

DETAILED DESCRIPTION OF THE INVENTION

Figure 3A:
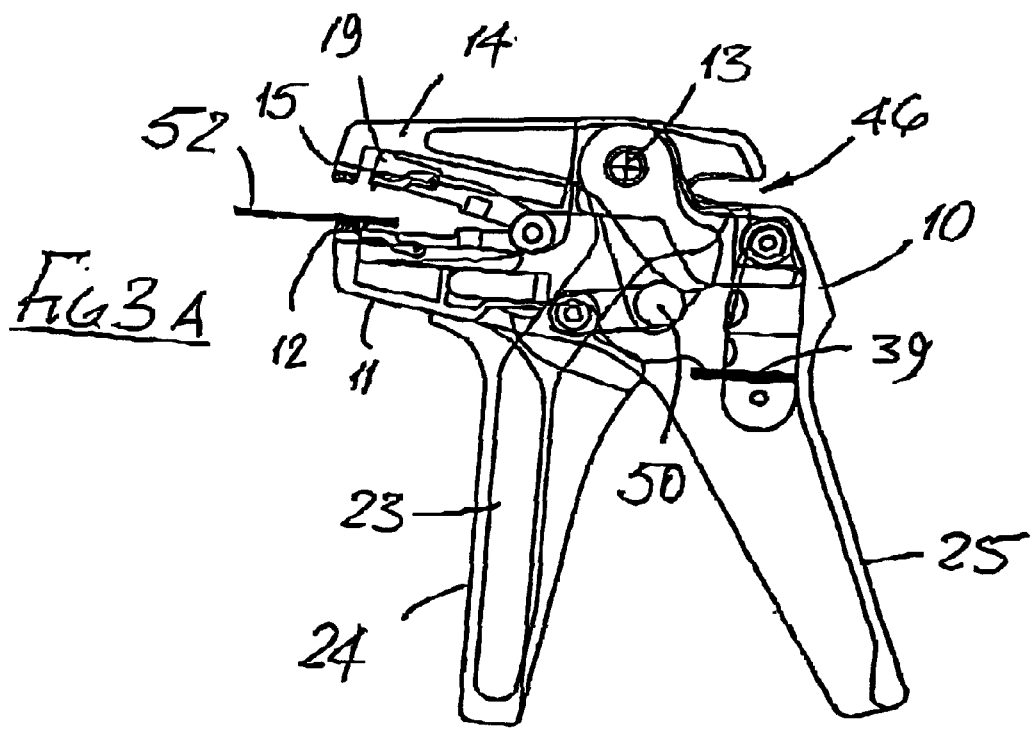
FIGS. 3A, 3B, 3C and 3D and views similar to that of FIG. 1, but with the operating lever respectively at 0° (the initial position of FIG. 1), and displaced through 4.5°, 10° and 20° from the 0° position.

In the following description, the terms "front" and "forward" refer to the end of the wire stripping tool into which a wire to be stripped is inserted between clamping and stripping jaws—that is to say, the left hand end of the tool shown in FIG. 1. The terms "rear", "reward", "left" and "right" all should be construed accordingly.

The wire stripper shown in the drawings has a moulded plastics material main body 10, illustrated in FIG. 2 as comprising left and right hand halves 10L and 10R. The body defines a fixed clamping jaw 11 extending forwardly of the tool and having a serrated gripping tip 12 at the front of the tool. A shaft 13 extends through bores moulded in the body halves above and behind the fixed clamping jaw 11 and a moving clamping jaw 14 is pivoted to that shaft 13. This moving damping jaw 14 also has a serrated gripping tip 15 which may move towards and away from tip 12 on pivoting movement of the jaw 14. The fixed jaw 11 is moulded integrally with the two body halves and the moving jaw 14 is also moulded from a plastics material but has a pair of metal arms 16 carried therein and which are journalled on the shaft 13. Each arm 16 defines a respective second cam surface 17, the function of which will be described below.

A pair of stripping jaws 19 are arranged between the clamping jaws 11 and 14, the stripping jaws being pivoted together at their rearward ends by a pin 20 secured to the lower jaw and extending through a bore in the upper jaw. A compression spring 21 extends between the two stripping jaws in order to urge those jaws apart; the stripping jaws respectively bear on the adjacent clamping jaws and thus also urge apart the clamping jaws. The forward end of each stripping jaw is provided with a cutting edge 22 extending transversely across the jaw, to cut into insulation to be stripped from a wire.

An operating lever 23 is also journalled on shaft 13 and extends transversely across the clamping and stripping jaws, to project downwardly from the body 10. A one-piece moulded plastics handle 24 is fitted around the operating lever 23, the handle being shown in two pieces in FIG. 2 for the sake of clarity. The handle 24 projects from the body 10 in generally the same direction as a fixed handle 25 formed integrally with the body, the handles being configured to permit easy manual gripping by a user and arranged for squeezing together as shown in FIGS. 3A to 3D.

A draw-bar 28 defines a first cam surface 29 and is slidably mounted in the body for movement in the forward and rearward directions. The draw-bar has a hole 30 towards its forward end, through which extends pin 20 formed on the lower stripping jaw so as to connect the pair of stripping jaws to the draw-bar for movement therewith. The draw-bar includes a forward extension 31 which slides on a surface 32 formed at the rearward end of the fixed clamping jaw 11, to assist guiding of the draw-bar.

A mounting block 33 having left and right parts 33L and 33R is provided in the rear portion of the main body 10 and is held in place by a pin 34 extending through aligned holes in the block parts and also through corresponding holes in the body halves. A guide plate 35 has a leg 36 partially received in a groove 37, the plate 35 also having a hole formed therein, and through which extends the shaft 13, so locking the guide plate in position. A lower edge 38 of the guide plate defines a further surface constraining movement of the draw-bar 28. At its lower end, the mounting block supports a shoe 39, along which runs the lower rear corner of the draw-bar. In this way, the draw-bar is constrained to run linearly, sliding on surfaces 32 and 38, and on the shoe 39. The lower edge of the leg 35 of the guide plate 35 defines a third cam surface 40, the purpose of which will be described below.

A torsion spring 41 (shown in the relaxed state in FIG. 2) is received on a boss 42 defined by the mounting block 33 and has one arm 43 which engages rear edge 44 of the draw-bar 28, the other spring arm 45 engaging an internal rear surface of the body 10. This spring thus urges the draw-bar forwardly, to the initial position shown in FIGS. 1 and 3A.

A slot 46 is formed in the body 10 and the guide plate defines a static blade 47 which projects rearwardly, into but from above the slot 46. The operating lever 23 defines a moving blade 48 which co-operates with the static blade 47 to form a wire cutter, arranged to cut through a wire inserted transversely across the slot when the tool is in its initial position.

It will be appreciated that when the tool is in its initial position as shown in FIG. 1, the first and second cam surfaces 29 and 17 together with a rearwardly facing edge 49 of the operating lever 23 define an open area. A roller 50 is located in that area, the roller being rotatably supported between a pair of arms 51 the forward ends of which are pivoted to the operating lever 23.

Figure 3B:
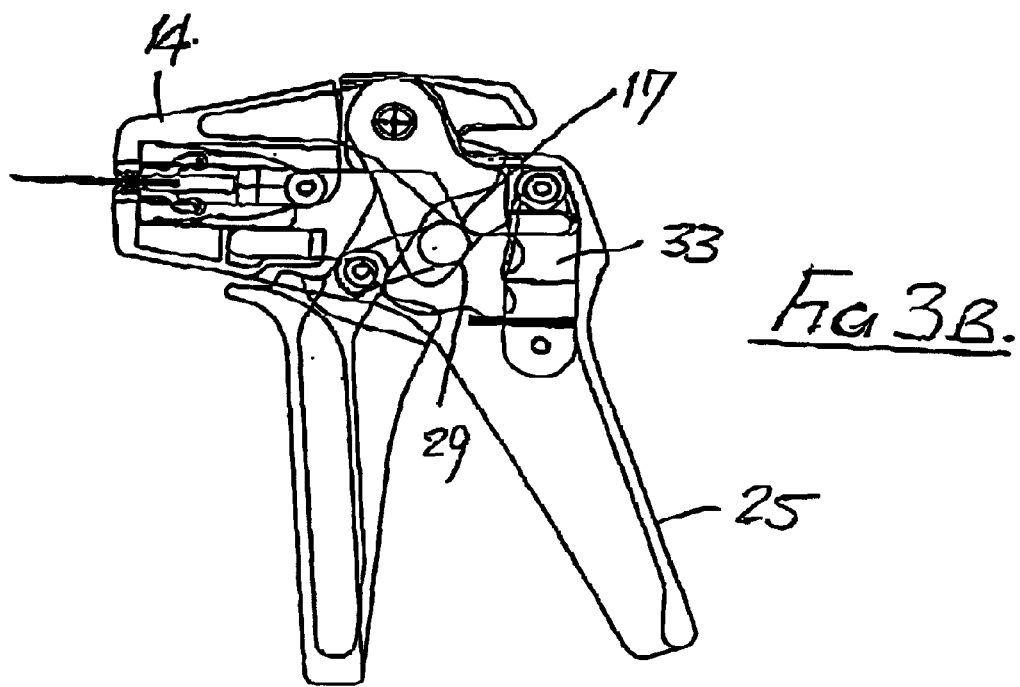

The tool described above operates in the following manner, starting from the initial position shown in FIGS. 1 and 3A. The draw-bar 28 is urged forwardly by the torsion spring 41, so moving the stripping jaws 19 fully forward between the clamping jaws 11 and 14, and both jaws are held separated by the action of spring 21. The roller 50 lies within the space bound by the first and second cam surfaces 29 and 17, and the edge 49 of the operating lever. A relatively small movement of the operating lever 23 in the counter-clockwise direction (as shown in FIG. 3B) drives the roller 50 up the first cam surface 29 to push the second cam surface 17 upwardly, so closing both the clamping and stripping jaws.

Figure 3C:
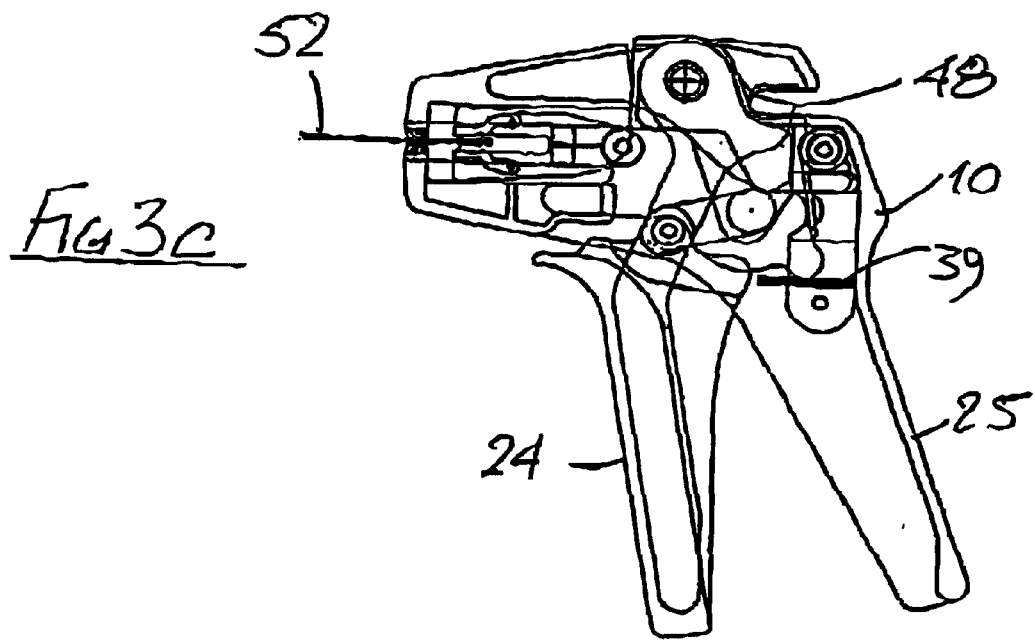

The above action continues until a wire 52 to be stripped is clamped between the gripping tips 12 and 15 of the clamping jaws, the cutting edges 22 of the stripping jaws then cutting into the insulation on the wire. When the clamping jaws can move no closer together, the roller 50 then runs along the second cam surface 17, thrusting the draw-bar 28 rearwardly, through the first cam surface 29 (as shown in FIG. 3C). This pulls the stripping jaws rearwardly, so separating the end portion of the insulation from the remainder of the insulation on the wire.

Should the insulation offer resistance to movement of the stripping jaws, the roller will tend to move further up the first cam surface 29, so pressing harder on the second cam surface 17 and thus increasing the clamping force, until sufficient force is exerted on the draw-bar to allow the stripping jaws to move rearwardly.

Figure 3D:
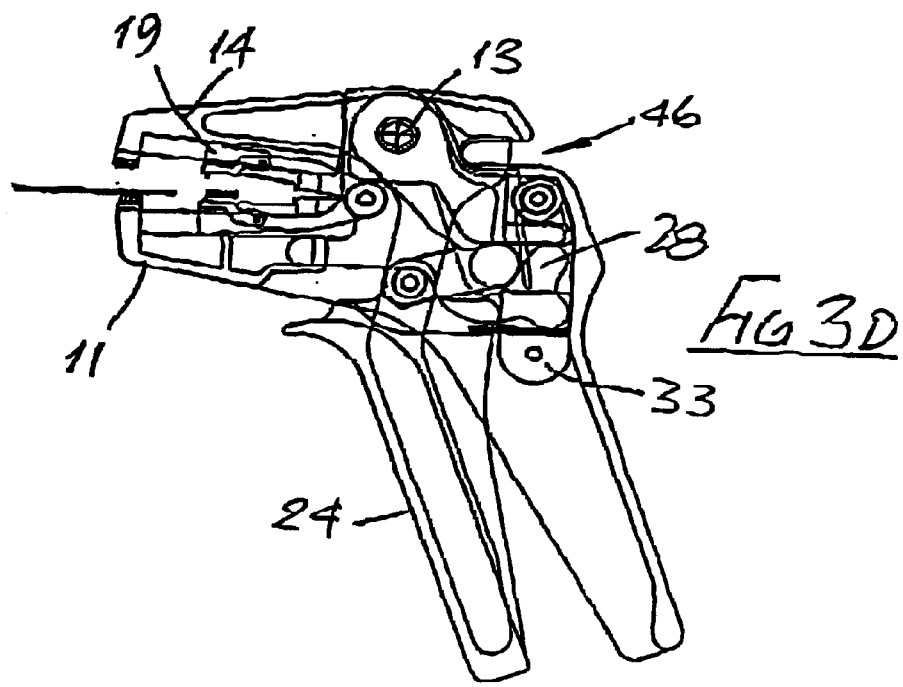

As the end of the stripping cycle is approached, the roller 50 moves onto the third cam surface 40 and so comes clear of the second cam surface 17. This allows the arm 16, defining the second cam surface 17, to turn clockwise, so unloading the pressure applied by the clamping jaws 11 and 14. When the operating lever 23 can be moved no further in the counter-clockwise direction (as shown in FIG. 3D). it is released and the spring 41 returns the draw-bar to its initial position, simultaneously returning the operating lever 23 to its initial position and also the stripping jaws 19.

Figure 4:
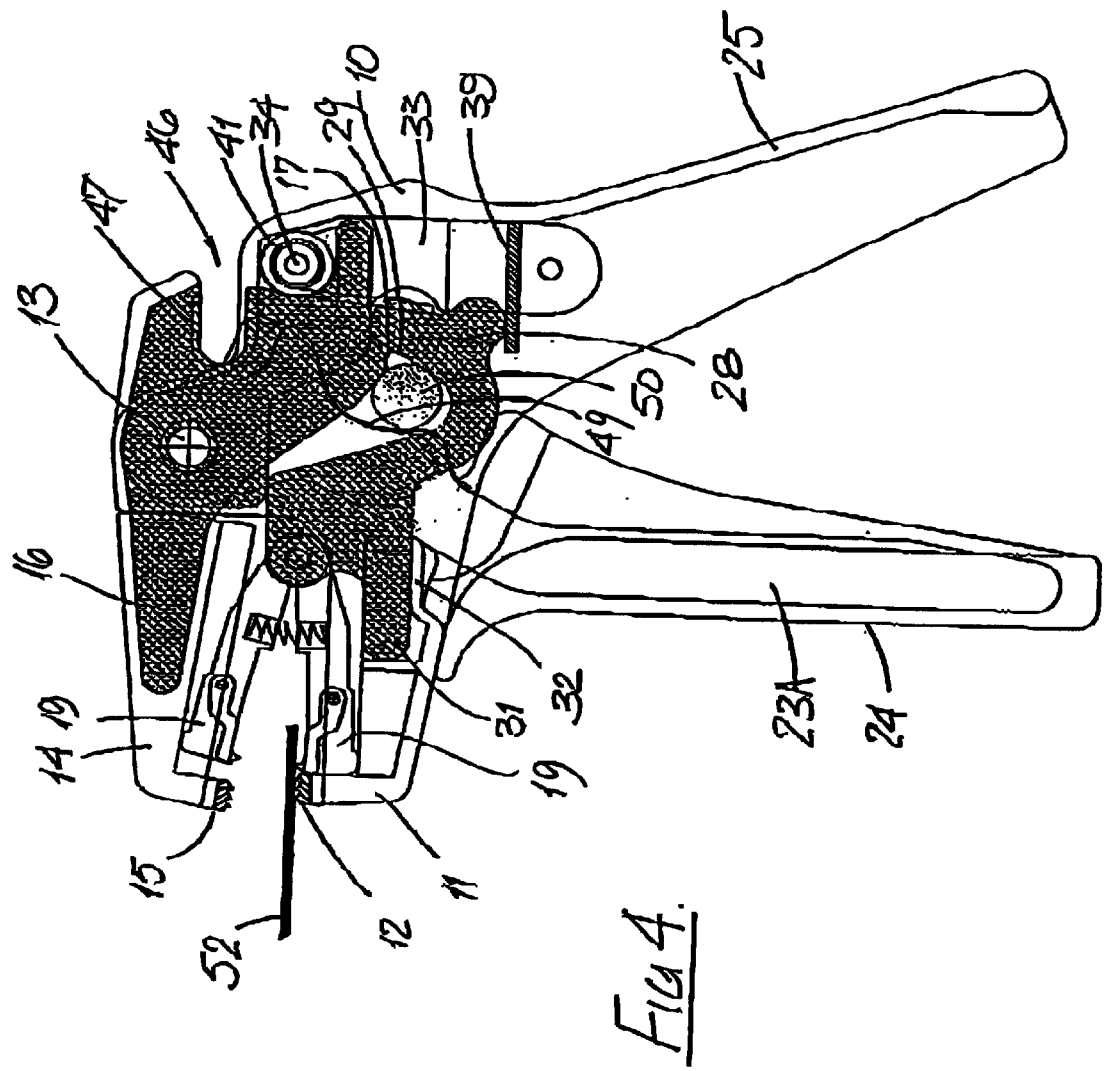
FIG. 4 is a sectional view through a second embodiment of wire stripper being a modified form of the stripper shown in FIG. 1.

FIG. 4 shows a modified form of the wire stripper described above and like reference numbers are used to designate like components; those components will not be described in detail again here. In the embodiment of FIG. 4, the arms 51 are omitted and the roller is free to float within the space bound by the first and second cam surfaces 29 and 17, and the rearwardly-facing edge 49 of the operating lever.

The region of the operating lever 23A defining the edge 49 is modified so that the edge may directly drive the roller 50, initially up the first cam surface 29 to close the second clamping jaw 14 by acting on the second cam surface 17, and then to drive the draw-bar 28 rearwardly by running along the second cam surface 17. Thus, the action of the stripper is essentially the same as has been described above with reference to FIGS. 1 to 3, except for the direct driving of the roller 50 by edge 49 of the operating lever 10A.

What is claimed is:

1. A manually-operable wire stripper comprising:
   a body defining at its forward region a first wire-clamping jaw and at its rear a fixed handle;
   a second wire-clamping jaw pivoted about a first axis to the body and opposed to the first wire-clamping jaw for co-operation therewith to clamp a wire to be stripped, the first axis being displaced to one side of the centerline of the pair of clamping jaws;
   a pair of co-acting stripping jaws arranged between the clamping jaws for sliding movement with respect thereto along the length of a clamped wire, closing movement of the clamping jaws closing the stripping jaws; and
   an operating mechanism having:
      an operating lever pivoted about said first axis to the body and extending across the line of sliding movement of the stripping jaws to project from the body, juxtaposed to the fixed handle for gripping therewith;
      a draw-bar slidably mounted in the body and connected to the stripping jaws to effect said sliding movement thereof, the draw-bar defining a generally forwardly-facing first cam surface;
      an arm projecting from the second clamping jaw and having a second cam surface, and
      a roller located between the first and second cam surfaces and a rearwardly directed edge of the operating lever, the roller being driven by rearward pivoting movement of the lever;
   the arrangement of the operating mechanism being such that during initial movement of the operating lever the roller is driven against the first and second cam surfaces to effect closing movement of the second wire-clamping jaw until a wire to be stripped is clamped, whereafter continued movement of the operating lever drives the roller along the second cam surface thereby driving the draw-bar rearwardly through the first cam surface, to effect sliding stripping movement of the stripping jaws.

2. A wire stripper as claimed in claim 1, wherein the rearwardly directed edge of the operating lever defines a driving surface which drivingly engages the roller on rearward pivoting movement of the operating lever.

3. A wire stripper as claimed in claim 1, wherein the roller is rotatably mounted to one end of a driving member, the other end of the driving member being connected to the operating lever.

4. A wire stripper as claimed in claim 2, wherein the second cam surface is profiled so that as the roller approaches the limit of its movement in the stripping direction, the second clamping jaw is allowed to move away from the first clamping jaw.

5. A wire stripper as claimed in claim 1, wherein the body defines a fixed third cam surface arranged so that the roller runs along the third cam surface as the roller approaches the limit of its movement in the stripping direction, the third cam surface freeing the roller from the second cam surface to allow the second clamping jaw to move away from the first clamping jaw.

6. A wire stripper as claimed in claim 1, wherein the pair of stripping jaws are pivoted together about a second axis at their rearward ends, the stripping jaws also being connected to the draw-bar about the same second axis.

7. A wire stripper as claimed in claim 6, wherein a first spring is arranged between the stripping jaws to urge the jaws apart, the clamping jaws also being urged apart by the first spring acting through the stripping jaws.

8. A wire stripper as claimed in claim 1, wherein a second spring is provided to urge the draw-bar forwardly, to an initial position ready to perform a stripping cycle.

9. A wire stripper as claimed in claim 1, wherein the draw-bar comprises a profiled plate lying on the center-line of the clamping and stripping jaws, the plate being constrained to perform linear sliding movement substantially in alignment with the length of the first clamping jaw.

10. A wire stripper as claimed in claim 9, wherein a guide plate is secured in the body on the center line of the clamping and stripping jaws, the guide plate constraining the draw-bar to perform linear sliding movement.

11. A wire stripper as claimed in claim 10, wherein the guide plate defines a third cam surface arranged so that the roller runs along the third cam surface as the roller approaches the limit of its movement in the stripping direction, the third cam surface freeing the roller from the second cam surface to allow the second clamping jaw to move away from the first clamping jaw.

12. A wire stripper as claimed in claim 10, wherein the guide plate defines a static cutter blade which co-operates with a moving cutter blade formed as a part of the operating lever.

13. A wire stripper as claimed in claim 9, wherein the second clamping jaw has associated therewith a pair of arms disposed one to each side of the draw-bar and each defining a respective second cam surface.

14. A wire stripper as claimed in claim 9, wherein the roller is rotatably mounted between the one ends of a pair of spaced connecting members, the other ends of the connecting members being pivoted to the operating lever with the draw-bar and the operating lever lying between the connecting members.

15. A manually-operable wire stripper comprising:
   a body defining at its forward region a first wire-clamping jaw and at its rear a fixed handle;
   a second wire-clamping jaw pivoted about a first axis to the body and opposed to the first wire-clamping jaw for co-operation therewith to clamp a wire to be stripped, the first axis being displaced to one side of the center-line of the pair of clamping jaws;
   a pair of co-acting stripping jaws arranged between the clamping jaws for sliding movement with respect thereto along the length of a clamped wire, closing movement of the clamping jaws closing the stripping jaws; and
   an operating mechanism having:
      an operating lever pivoted about said first axis to the body and extending across the line of sliding movement of the stripping jaws to project from the body, juxtaposed to the fixed handle for gripping therewith;
      a draw-bar slidably mounted in the body and connected to the stripping jaws to effect said sliding movement thereof, the draw-bar defining a generally forwardly-facing first cam surface;
      an arm projecting from the second clamping jaw and having a second cam surface;
      a guide plate secured in the body to constrain the draw-bar to perform linear sliding movement, the guide plate defining a third cam surface; and
      a roller located between the first and second cam surfaces and a rearwardly directed edge of the operating lever, the roller being driven by rearward pivoting movement of the lever;
   the arrangement of the operating mechanism being such that during initial movement of the operating lever the roller is driven against the first and second cam surfaces to effect closing movement of the second wire-clamping jaw until a wire to be stripped is clamped, whereafter continued movement of the operating lever drives the roller along the second cam surface thereby driving the draw-bar rearwardly through the first cam surface, to effect sliding stripping movement of the stripping jaws, and then the roller runs along the third cam surface as the roller approaches the limit of its movement in the stripping direction, the third cam surface freeing the roller from the second cam surface to allow the second clamping jaw to move away from the first clamping jaw.

16. A wire stripper as claimed in claim 15, wherein the rearwardly directed edge of the operating lever defines a driving surface which drivingly engages the roller on rearward pivoting movement of the operating lever.

17. A wire stripper as claimed in claim 16, wherein the roller is rotatably mounted to one end of a driving member, the other end of the driving member being connected to the operating lever.

18. A wire stripper as claimed in claim 15, wherein the draw-bar comprises a profiled plate lying on the center-line of the clamping and stripping jaws, the plate being constrained to perform linear sliding movement substantially in alignment with the length of the first clamping jaw.

19. A wire stripper as claimed in claim 15, wherein the guide plate defines a static cutter blade which co-operates with a moving cutter blade formed as a part of the operating lever.

20. A wire stripper as claimed in claim 15, wherein the roller is rotatably mounted between the one ends of a pair of spaced connecting members, the other ends of the connecting members being pivoted to the operating lever with the draw-bar and the operating lever lying between the connecting members.

\* \* \* \* \*